(12) United States Patent (10) Patent No.: US 12,566,015 B2

Murakami et al. (45) Date of Patent: Mar. 3, 2026

(54) COUPLING DEVICE AND REFRIGERANT CIRCULATION DEVICE

(71) Applicant: NIDEC CORPORATION, Kyoto (JP)

(72) Inventors: Taku Murakami, Kyoto (JP); Hirotaka Watanabe, Kyoto (JP); Naoya Nonomura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/757,753

(22) Filed: Jun. 28, 2024

(65) Prior Publication Data

US 2025/0003656 A1 Jan. 2, 2025

(30) Foreign Application Priority Data

Jun. 30, 2023 (JP) ................................. 2023-108811
May 17, 2024 (JP) ................................. 2024-080978

(51) Int. Cl.
*F16L 33/18* (2006.01)
*F25B 41/40* (2021.01)
*F16L 33/02* (2006.01)

(52) U.S. Cl.
CPC .............. *F25B 41/40* (2021.01); *F16L 33/18* (2013.01); *F16L 33/02* (2013.01)

(58) Field of Classification Search
CPC . F16L 33/18; F16L 33/08; F16L 33/10; F16L 33/04; F16L 58/18; F16L 58/185; F16L 58/181; F25B 41/40
See application file for complete search history.

(56) References Cited

U.S. PATENT DOCUMENTS

| | | | |
|---|---|---|---|
| 2002/0024218 A1 | 2/2002 | Manuli | |
| 2015/0130184 A1* | 5/2015 | Filipczak | .............. F16L 33/085 285/252 |
| 2023/0167925 A1* | 6/2023 | Wang | ..................... F16K 27/02 285/21.1 |

* cited by examiner

*Primary Examiner* — Aaron M Dunwoody
(74) *Attorney, Agent, or Firm* — Keating & Bennett, LLP

(57) ABSTRACT

A coupling device includes a first connection portion, a second connection portion, a tube portion, and a sealing portion. The first connection portion is connectable to an external socket or plug, and includes a first flow path through which a fluid flows. The second connection portion includes a first inner surface defining a second flow path continuous with the first flow path, and a first outer surface positioned farther outward than the first inner surface. The tube portion includes an end portion to be inserted into the second connection portion, and a second inner surface positioned outside the first outer surface and defining a third flow path. The sealing portion is interposed between the first outer surface and the second inner surface.

19 Claims, 5 Drawing Sheets

COUPLING DEVICE AND REFRIGERANT CIRCULATION DEVICE

CROSS-REFERENCE TO RELATED APPLICATIONS

The present application claims priority under 35 U.S.C. § 119 to Japanese Patent Application No. 2023-108811, filed on Jun. 30, 2023, and Japanese Patent Application No. 2024-080978, filed on May 17, 2024, the entire contents of which are hereby incorporated herein by reference.

1. FIELD OF THE INVENTION

The present disclosure relates to coupling devices and refrigerant circulation devices.

2. BACKGROUND

The coupling device includes a flow tube including a flow path and an adapter assembly. An end portion of the flow tube is connected to the adapter assembly.

In the coupling device, there is often a difference between the thermal expansion coefficient of the flow tube and the thermal expansion coefficient of the adapter assembly. Due to such a difference in thermal expansion coefficient, there is a risk that the fluid leaks from between the flow tube and the adapter assembly during expansion or contraction.

SUMMARY

A coupling device according to one example embodiment of the present disclosure includes a first connection portion, a second connection portion, a tube portion, and a sealing portion. The first connection portion is connectable to an external socket or plug, and includes a first flow path through which a fluid flows. The second connection portion includes a first inner surface defining a second flow path continuous with the first flow path, and a first outer surface positioned more outward than the first inner surface. The tube portion includes an end portion into which the second connection portion is inserted, and a second inner surface positioned outside the first outer surface and defining a third flow path. The sealing portion is interposed between the first outer surface and the second inner surface.

A refrigerant circulation device according to another example embodiment of the present disclosure includes a housing and a coupling device. The housing includes a socket or a plug. The coupling device includes a first connection portion, a second connection portion, a tube portion, and a sealing portion. The first connection portion is connected to the socket or the plug and includes a first flow path through which a fluid flows. The second connection portion includes a first inner surface defining a second flow path continuous with the first flow path, and a first outer surface positioned farther outward than the first inner surface. The tube portion includes an end portion into which the second connection portion is inserted, and a second inner surface positioned outside the first outer surface and defining a third flow path. The sealing portion is interposed between the first outer surface and the second inner surface.

The above and other elements, features, steps, characteristics and advantages of the present disclosure will become more apparent from the following detailed description of the example embodiments with reference to the attached drawings.

DETAILED DESCRIPTION

Figure 1:
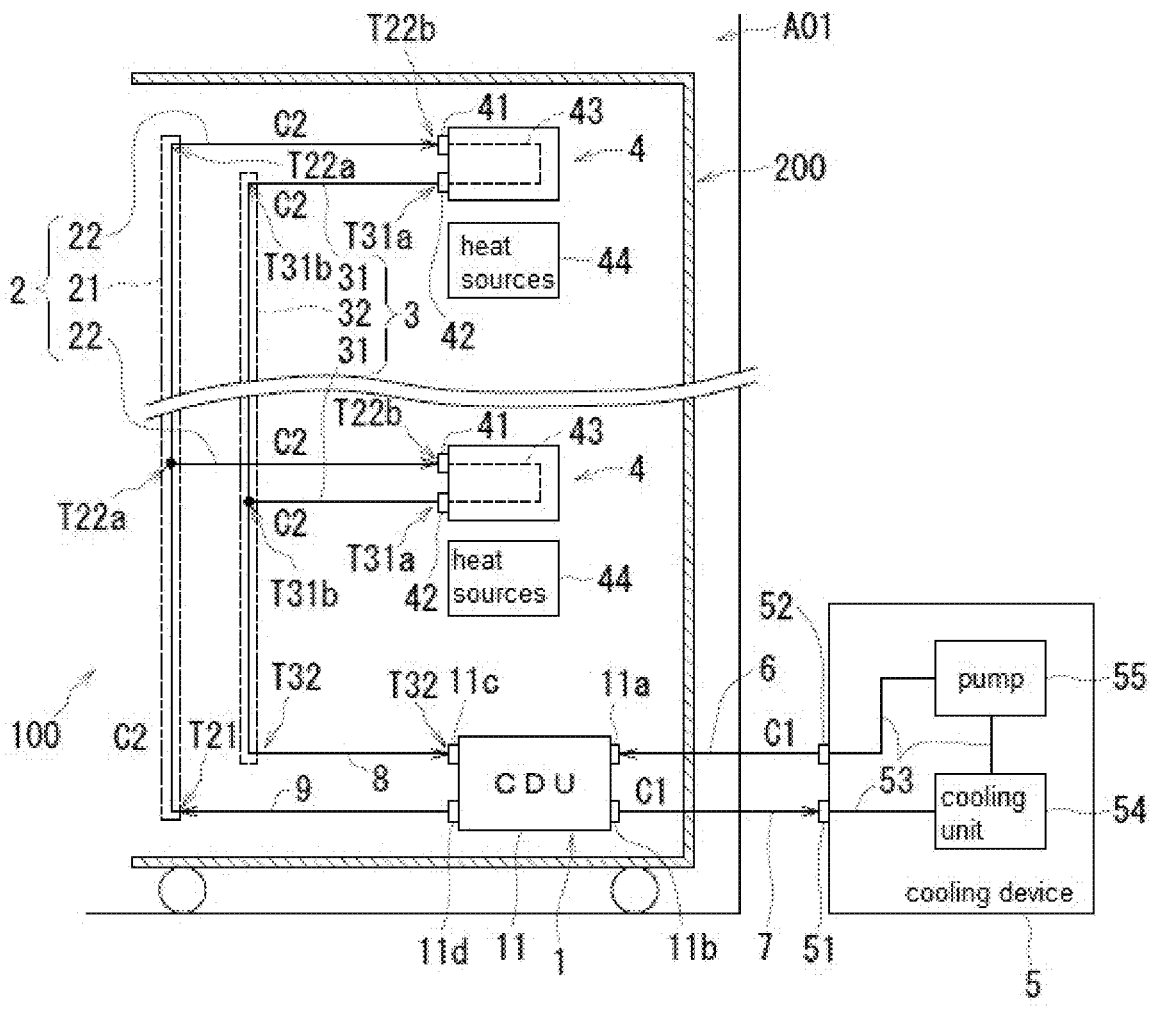
FIG. 1 is a view showing a configuration of a cooling system 100 according to an example embodiment of the present disclosure.

Hereinafter, example embodiments of the present disclosure will be described with reference to the drawings. In the drawings, the same or corresponding parts are denoted by the same reference sign and description thereof will not be repeated.

In FIG. 1, the cooling system 100 includes a refrigerant circulation device (hereinafter, also called "CDU") 1, a distribution manifold 2, a collection manifold 3, at least one cold plate 4, a cooling device 5, flow paths 6 and 7, and the coupling devices 8 and 9, in a use state. At least one heat source 44 installed in a space A01 is cooled by the elements.

When the cooling system 100 includes one cold plate 4, the cooling system 100 needs not include the distribution manifold 2 and the collection manifold 3. In this case, the coupling devices 8 and 9 directly connect the cold plate 4 and the CDU 1.

The CDU 1, the distribution manifold 2, the collection manifold 3, and the cold plate 4 are installed in the space A01. The space A01 is a server room, for example.

The space A01 is provided with a rack 200. For example, a plurality of the heat sources 44 are accommodated in the rack 200. Each of the heat sources 44 is, for example, an electronic component or electronic equipment. The electronic component is a component constituting electronic equipment, and includes, for example, a central processing unit (so-called CPU), an electrolytic capacitor, a power semiconductor module, or a printed circuit board. The electronic component operates by power supply and generates heat. The electronic equipment is a rack mounted server or a blade server. The electronic equipment may also be a projector, a personal computer, or a display.

The CDU 1 can be circulated in the marketplace as an element of the cooling system 100. In the case of circulation as the cooling system 100, the cooling device 5 and the flow paths 6 and 7 may be excluded from the cooling system 100. The CDU 1 may be circulated alone in the marketplace. In the present example embodiment, the CDU 1 is accommodated, for example, in the rack 200 when used. However, the present disclosure is not limited to this, and the CDU 1 may be installed outside the rack 200 when used.

The CDU 1 includes a housing 11. The housing 11 includes an exterior body and a frame, and defines an internal space of the CDU 1 from an external space of the CDU 1 by the exterior body. The exterior body is, for example, an exterior panel or a casing. The housing 11 includes a primary inflow port 11a, a primary outflow port 11b, a secondary inflow port 11c, and a secondary outflow port 11d in the exterior body. Each of the secondary inflow port 11*c* and the secondary outflow port 11*d* is a socket or a plug, and is an example of the "external socket or plug" of the present disclosure.

Figure 2:
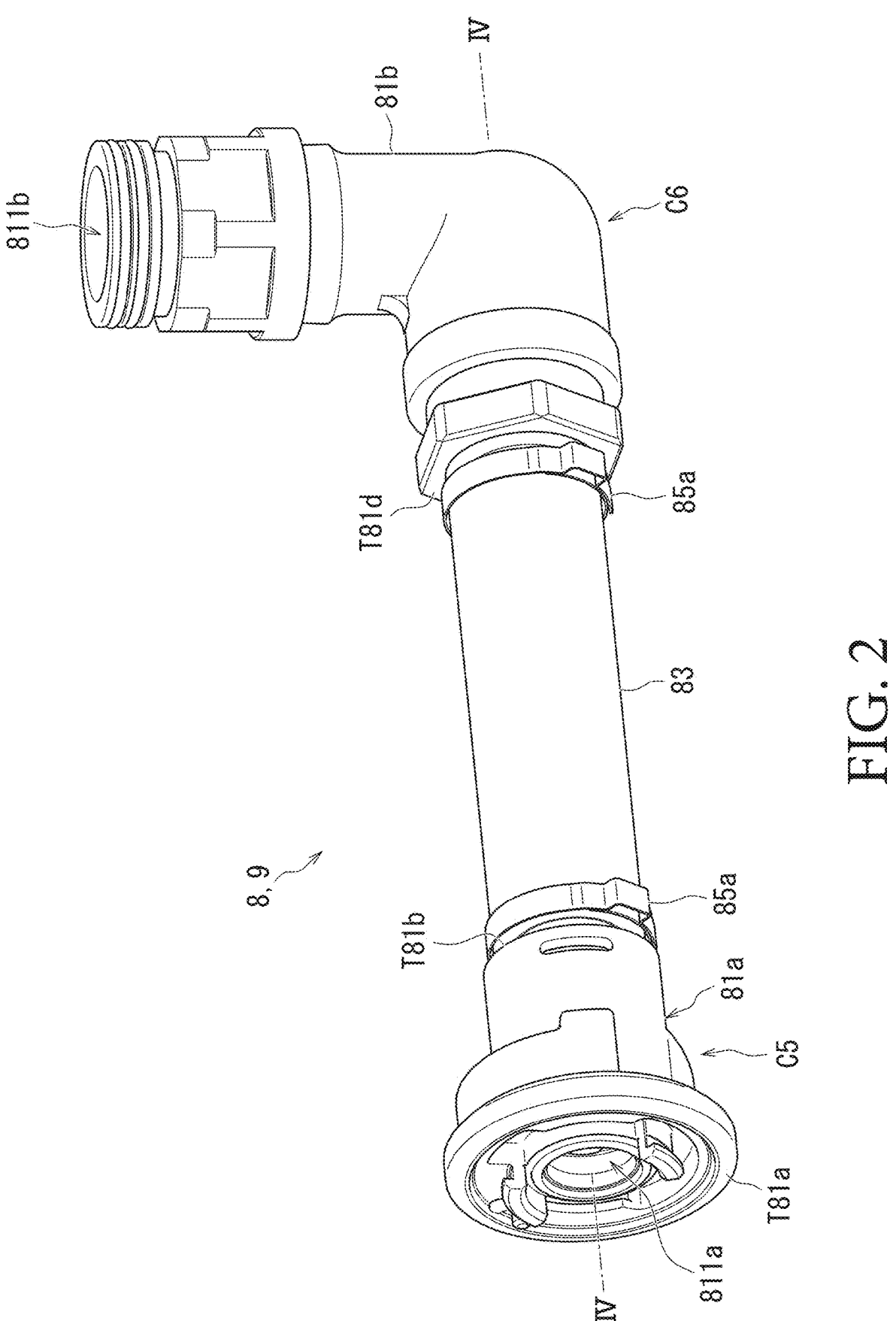
FIG. 2 is a perspective view showing a configurations of coupling devices 8 and 9 shown in FIG. 1.

A primary refrigerant C1 having a low temperature flows into the primary inflow port 11*a* through the flow path 6. A connection portion 81*a* (see FIG. 2) of the coupling device 8 is connected to the secondary inflow port 11*c*. A secondary refrigerant C2 having a high temperature flows into the secondary inflow port 11*c* from the coupling device 8. The CDU 1 performs heat exchange, by a heat exchanger (not shown) included in the CDU 1, between the primary refrigerant C1 (low temperature) flowed into the CDU 1 from the primary inflow port 11*a* and the secondary refrigerant C2 (high temperature) flowed into the CDU 1 from the secondary inflow port 11*c*. Due to this, in the CDU 1, the thermal energy of the primary refrigerant C1 moves to the secondary refrigerant C2. Specifically, the temperature of the secondary refrigerant C2 decreases when flowing out from the CDU 1 as compared with when flowing into the CDU 1. The CDU 1 pumps the secondary refrigerant C2 reached a low temperature toward the secondary outflow port 11*d* by a pump (not shown) included in the CDU 1. One of the connection portions 81*a* and 81*b* (see FIG. 2) of the coupling device 9 is connected to the secondary outflow port 11*d*. Which one of the connection portions 81*a* and 81*b* to be connected to the secondary outflow port 11*d* is determined by specifications of the secondary outflow port 11*d* and the distribution manifold 2 and the like. From the secondary outflow port 11*d*, the secondary refrigerant C2 flows out to the coupling device 9. The CDU 1 sends the primary refrigerant C1 reached a high temperature from the primary outflow port 11*b* to the flow path 7.

The primary refrigerant C1 is a fluid such as a coolant, for example. Examples of the coolant include an antifreeze liquid and pure water. A typical example of the antifreeze liquid is an ethylene glycol aqueous solution or a propylene glycol aqueous solution. The secondary refrigerant C2 is a fluid of the same type as or a different type from the primary refrigerant C1. At least one of the primary refrigerant C1 and the secondary refrigerant C2 may be a gas refrigerant. The secondary refrigerant C2 is an example of the "fluid" of the present disclosure.

In FIG. 1, the distribution manifold 2 includes a common flow path 21 and a plurality of individual flow paths 22. FIG. 1 shows only two of the individual flow paths 22 for convenience of description. The secondary refrigerant C2 (i.e., fluid) can flow through the common flow path 21 and the individual flow paths 22. One end T21 of the common flow path 21 is connected to the connection portion 81*b* (see FIG. 2) of the coupling device 9, and is used as an inflow port of the secondary refrigerant C2 in the distribution manifold 2. One end T22*a* of each of the individual flow paths 22 is connected to the common flow path 21. An other end T22*b* of each of the individual flow paths 22 is used as an outflow port of the secondary refrigerant C2 in the distribution manifold 2, and is individually connected to an inflow port 41 of the cold plate 4. Therefore, the secondary refrigerant C2 (low temperature) flowed into the inflow port (i.e., the one end T21) of the distribution manifold 2 first flows in the common flow path 21, is split into the individual flow paths 22, and then flows out from the respective outflow ports (i.e., the other end T22*b*) of the distribution manifold 2.

In each example embodiment, the term "connection" means "connection with which a fluid can flow" unless there is an adverb or an adjectival noun that additionally explains "connection".

In FIG. 1, each of the cold plates 4 is in thermal contact with at least one heat source 44. The secondary refrigerant C2 (low temperature) flows inside each of the cold plates 4. In detail, each of the cold plates 4 is arranged in direct thermal contact with the heat source 44. Each of the cold plates 4 may be arranged in thermal contact with the heat source 44 via a thermal conduction sheet (not shown), for example. That is, the term "thermal contact" includes the meaning of "direct thermal contact" and the meaning of "indirect thermal contact".

Each of the cold plates 4 includes the inflow port 41, an outflow port 42, and an internal flow path 43 of the secondary refrigerant C2. The internal flow path 43 connects the inflow port 41 and the outflow port 42. The secondary refrigerant C2 (low temperature) flows into the inflow port 41 from the individual flow path 22 connected to the inflow port 41. The secondary refrigerant C2 flows through the internal flow path 43 to the outflow port 42. Therefore, the thermal energy generated by the heat source 44 moves to the secondary refrigerant C2 flowing through the internal flow path 43 of the cold plate 4 in thermal contact with the heat source 44. As a result, the heat source 44 is cooled, and the temperature of the secondary refrigerant C2 rises. The secondary refrigerant C2 (high temperature) flows out from the outflow port 42 to an individual flow path 31 of the collection manifold 3.

In FIG. 1, the collection manifold 3 includes a plurality of the individual flow paths 31 and a common flow path 32. FIG. 1 shows only two of the individual flow paths 31 for convenience of description. The secondary refrigerant C2 (i.e., fluid) can flow through the individual flow paths 31 and the common flow path 32. One end T31*a* of each of the individual flow paths 31 is individually connected to the outflow port 42 as an inflow port of the fluid in the collection manifold 3. An other end T31*b* of each of the individual flow paths 31 is connected to the common flow path 32. One end T32 of the common flow path 32 is used as an outflow port of the fluid in the collection manifold 3, and is connected to a connection portion 81*b* (see FIG. 2) of the coupling device 8. Therefore, the secondary refrigerant C2 flowed from the cold plate 4 into each inflow port (i.e., one end T31*a*) in the collection manifold 3 merges at the common flow path 32 and flows out from the one end T32 to the secondary inflow port 11*c* of the CDU 1. Therefore, the secondary refrigerant C2 circulates through the CDU 1, the distribution manifold 2, the cold plate 4, and the collection manifold 3 in this order.

In FIG. 1, the cooling device 5 is installed outside the space A01, for example. Note that the cooling device 5 may be installed any of indoors and outdoors. The cooling device 5 is, for example, a chiller or a cooling tower. The cooling device 5 includes an inflow port 51, an outflow port 52, and an internal flow path 53 of the primary refrigerant C1, a cooling unit 54, and a pump 55. The internal flow path 53 connects the inflow port 51 and the outflow port 52. Each of the cooling unit 54 and the pump 55 is inserted on the internal flow path 53.

The primary refrigerant C1 flows into the inflow port 51 through the flow path 7. The primary refrigerant C1 flows into the cooling unit 54 from the inflow port 51 through the internal flow path 53. The cooling unit 54 cools the primary refrigerant C1 flowed into the cooling unit 54. The cooling system in the cooling unit 54 may be any of an air cooling system and a water cooling system. The primary refrigerant C1 flowed out of the cooling unit 54 flows into the pump 55 through the internal flow path 53. The pump 55 pumps, toward the outflow port 52, the primary refrigerant C1 flowed into the pump 55. The primary refrigerant C1 flowed out of the outflow port 52 flows into the primary inflow port 11*a* through the flow path 6. The flow paths 6 and 7 may have the same configuration as the coupling devices 8 and 9.

In FIG. 1, the pump 55 is positioned between the cooling unit 54 and the outflow port 52 in the internal flow path 53. However, the present disclosure is not limited to this, and the pump 55 may be positioned between the outflow port 52 and the cooling unit 54 in the internal flow path 53.

Next, the coupling devices 8 and 9 will be described in detail with reference to FIGS. 1 to 5.

In FIG. 1, the coupling device 8 connects the secondary inflow port 11*c* of the housing 11 and the one end T32 of the collection manifold 3. The coupling device 9 connects the secondary outflow port 11*d* of the housing 11 and the one end T21 of the distribution manifold 2. In the present example embodiment, as shown in FIGS. 2 to 5, the coupling devices 8 and 9 have substantially the same configuration. Note that the coupling devices 8 and 9 may be completely the same as or completely different from each other.

As shown in FIGS. 2 to 5, each of the coupling devices 8 and 9 includes two couplings C5 and C6, a tube portion 83, and a sealing portion 84.

Each of the couplings C5 has the connection portions 81*a* and 82*a*. That is, each of the coupling devices 8 and 9 includes the connection portions 81*a* and 82*a*, the tube portion 83, and the sealing portion 84. The connection portion 81*a* is a first example of the "first connection portion" of the present disclosure, and the connection portion 82*a* is a first example of the "second connection portion" of the present disclosure. Each of the couplings C5 and C6 is made of resin or metal, for example.

Each of the connection portions 81*a* is connectable to the secondary inflow port 11*c* or the secondary outflow port 11*d* (see FIG. 1) of the housing 11. In other words, the connection portion 81*a* is connectable to the secondary inflow port 11*c* or the secondary outflow port 11*d* outside the coupling devices 8 and 9.

The connection portion 81*a* includes a flow path 811*a* through which the secondary refrigerant C2 flows. The flow path 811*a* is a first example of the "first flow path" of the present disclosure.

Each of the secondary inflow port 11*c* and the secondary outflow port 11*d* (see FIG. 1) is a socket or a plug. The connection portion 81*a* is a socket or a plug that is paired with the socket or the plug on the housing 11 (see FIG. 1) side. That is, the connection portion 81*a* is connected to the socket or the plug on the housing 11 side.

The flow path 811*a* penetrates between both end surfaces T81*a* and T81*b* of the connection portion 81. In the flow path 811*a*, the secondary refrigerant C2 can flow in a use state of the cooling system 100 (see FIG. 1).

Each of the couplings C5 may include a valve for opening and closing the flow path 811*a* in the flow path 811*a* of the connection portion 81*a*. Each of the couplings C5 includes an attachment/detachment mechanism (not shown) by a latch (a press button or an operation lever) in the connection portion 81*a*. The attachment/detachment mechanism is a mechanism for immediately removing the connection portion 81*a* from the socket or the plug on the housing 11 side when the latch is operated by an operator. The coupling C6 may also include a valve and an attachment/detachment mechanism similar to those of the coupling C5.

The connection portion 82*a* protrudes in a first direction D01 from the end surface T81*b* of the connection portion 81*a*. That is, the first direction D01 is an orientation in which the connection portion 81*a* protrudes with respect to the connection portion 82*a*. An end portion T83*a* of the tube portion 83 is connectable to the connection portion 82*a*.

The connection portion 82*a* has a tubular shape and includes an inner surface 821*a* and an outer surface 822*a*. The inner surface 821*a* and the outer surface 822*a* are first examples of the "first inner surface" and the "first outer surface" of the present disclosure.

The inner surface 821*a* defines a flow path 823*a* continuous with the flow path 811*a*. The flow path 823*a* extends in the first direction D01 between both ends T82*a* and T82*b* of the connection portion 82*a*. An end in the first direction D01 of the flow path 832 is an opening A82*a* opened in the same direction. The flow path 823*a* is a first example of the "second flow path" of the present disclosure.

In the present example embodiment, the inner surface 821*a* is a columnar surface. The columnar surface can be made by rotating one of two line segments parallel to each other by using the other as an axis. When the inner surface 821*a* is a columnar surface, the fluid smoothly flows in the flow path 823*a*. The shape of the inner surface 821*a* is not limited to the columnar surface, and may be another shape.

The outer surface 822*a* is positioned more outward than the inner surface 821*a*. Specifically, the outer surface 822*a* is positioned in a radial direction D02 (see FIG. 5) of the first direction D01 relative to the inner surface 821*a*. In other words, the outer surface 822*a* expands in a circumferential direction D03 (see FIG. 5) of the first direction D01 more outward than the inner surface 821*a*.

Each of the couplings C6 has the connection portions 81*b* and 82*b*. In the present example embodiment, the connection portions 81*b* and 82*b* have different shapes from the connection portions 81*a* and 82*a*, respectively. The connection portions 81*b* and 82*b* may have the same shapes as the connection portions 81*a* and 82*a*, respectively. That is, each of the coupling devices 8 and 9 includes the connection portions 81*b* and 82*b*, the tube portion 83, and the sealing portion 84. The connection portion 81*b* is a second example of the "first connection portion" of the present disclosure, and the connection portion 82*b* is a second example of the "second connection portion" of the present disclosure.

Each of the connection portions 81*b* is connectable to the one end T32 of the collection manifold 3 or the one end T21 (see FIG. 1) of the distribution manifold 2. In other words, the connection portion 81*b* is connectable to the one ends T32 and T21 outside the coupling devices 8 and 9.

The connection portion 81*b* includes a flow path 811*b* through which the secondary refrigerant C2 flows. The flow path 811*b* is a second example of the "first flow path" of the present disclosure.

Each of the one end T32 of the collection manifold 3 or the one end T21 of the distribution manifold 2 is a socket or a plug. The connection portion 81*b* is a socket or a plug that is paired with the socket or the plug on the collection manifold 3 side. The connection portion 81*b* is a socket or a plug that is paired with the socket or the plug on the distribution manifold 2 side.

The flow path 811*b* penetrates between both end surfaces T81*c* and T81*d* of the connection portion 81*b*. In the flow path 811*b*, the secondary refrigerant C2 can flow in a use state of the cooling system 100 (see FIG. 1).

The connection portion 82*b* protrudes in a second direction D04 from the end surface T81*d* of the connection portion 81*b*. The second direction D04 is a direction in which the connection portion 81*b* protrudes with respect to the connection portion 82*b*. An end portion T83*b* of the tube portion 83 is connectable to the connection portion 82*b*.

The connection portion 82*b* has a tubular shape and includes an inner surface 821*b* and an outer surface 822*b*. The inner surface 821*b* and the outer surface 822*b* are second examples of the "first inner surface" and the "first outer surface" of the present disclosure.

The inner surface 821*b* defines a flow path 823*b* continuous with the flow path 811*b*. The flow path 823*b* extends in the second direction D04 between both ends T82*c* and T82*d* of the connection portion 82*b*. An end in the second direction D04 of the flow path 832 is an opening A82*b* opened in the same direction. The flow path 823*b* is a second example of the "second flow path" of the present disclosure.

In the example embodiment, the inner surface 821*b* may have a columnar surface or another shape, similarly to the inner surface 821*a*.

The outer surface 822*b* is positioned more outward than the inner surface 821*b*. Specifically, the outer surface 822*b* is positioned in a radial direction D05 (see FIG. 4) of the second direction D04 relative to the inner surface 821*b*. In other words, the outer surface 822*b* expands in a circumferential direction D06 (see FIG. 4) of the second direction D04 more outward than the inner surface 821*b*.

The tube portion 83 is a so-called tube or pipe, and is made of resin in the present example embodiment. The resin may be either a natural resin or a synthetic resin. The tube portion 83 may be made of a material having a thermal expansion coefficient different from that of the connection portions 82*a* and 82*b*.

The tube portion 83 has the end portions T83*a* and T83*b* into which the connection portions 82*a* and 82*b* are inserted, respectively. The tube portion 83 has an inner surface 831. The inner surface 831 is positioned outside the outer surfaces 822*a* and 822*b*. Specifically, the inner surface 831 is positioned on the outer surfaces 822*a* and 822*b* in a state where the connection portions 82*a* and 82*b* are inserted into the tube portion 83. The inner surface 831 defines a flow path 832 of the secondary refrigerant C2. The inner surface 831 is an example of the "second inner surface" of the present disclosure. The flow path 832 is an example of the "third flow path" of the present disclosure.

In the present example embodiment, the inner surface 831 is, for example, a columnar surface in a state where the connection portions 82*a* and 82*b* are not inserted into the tube portion 83.

The sealing portion 84 is interposed between the outer surfaces 822*a* and 822*b* and the inner surface 831. The sealing portion 84 suppresses a gap from being generated between the outer surfaces 822*a* and 822*b* and the inner surface 831. Specifically, the outer surfaces 822*a* and 822*b* and the inner surface 831 are different from each other in thermal expansion coefficient. The temperature of the secondary refrigerant C2 fluctuates within a range of about −20° C. or more and about 80° C. or less while flowing through the cooling system 100 (see FIG. 1). Therefore, in a case without the sealing portion 84, a gap may be generated between the outer surfaces 822*a* and 822*b* and the inner surface 831 due to expansion or contraction thereof in the use state of the cooling system 100. However, in the present example embodiment, since the sealing portion 84 suppresses a gap from being generated between the outer surfaces 822*a* and 822*b* and the inner surface 831, the secondary refrigerant C2 is suppressed from leaking between the outer surfaces 822*a* and 822*b* and the inner surface 831. That is, the sealing portion 84 seals leakage of the secondary refrigerant C2.

Specifically, the sealing portion 84 is a silicon sealant excellent in weather resistance, water resistance, and heat resistance in consideration of the characteristics of the cooling system 100.

The thermal expansion coefficient of the sealing portion 84 is smaller than the thermal expansion coefficient of the outer surfaces 822*a* and 822*b* and larger than the thermal expansion coefficient of the inner surface 831. As a result, the rate at which the sealing portion 84 expands or contracts due to the ambient temperature is an intermediate between the rate at which the outer surfaces 822*a* and 822*b* expand or contract and the rate at which the inner surface 831 expands or contracts. The secondary refrigerant C2 is suppressed from leaking from between the outer surfaces 822*a* and 822*b* and the inner surface 831.

Figure 3:
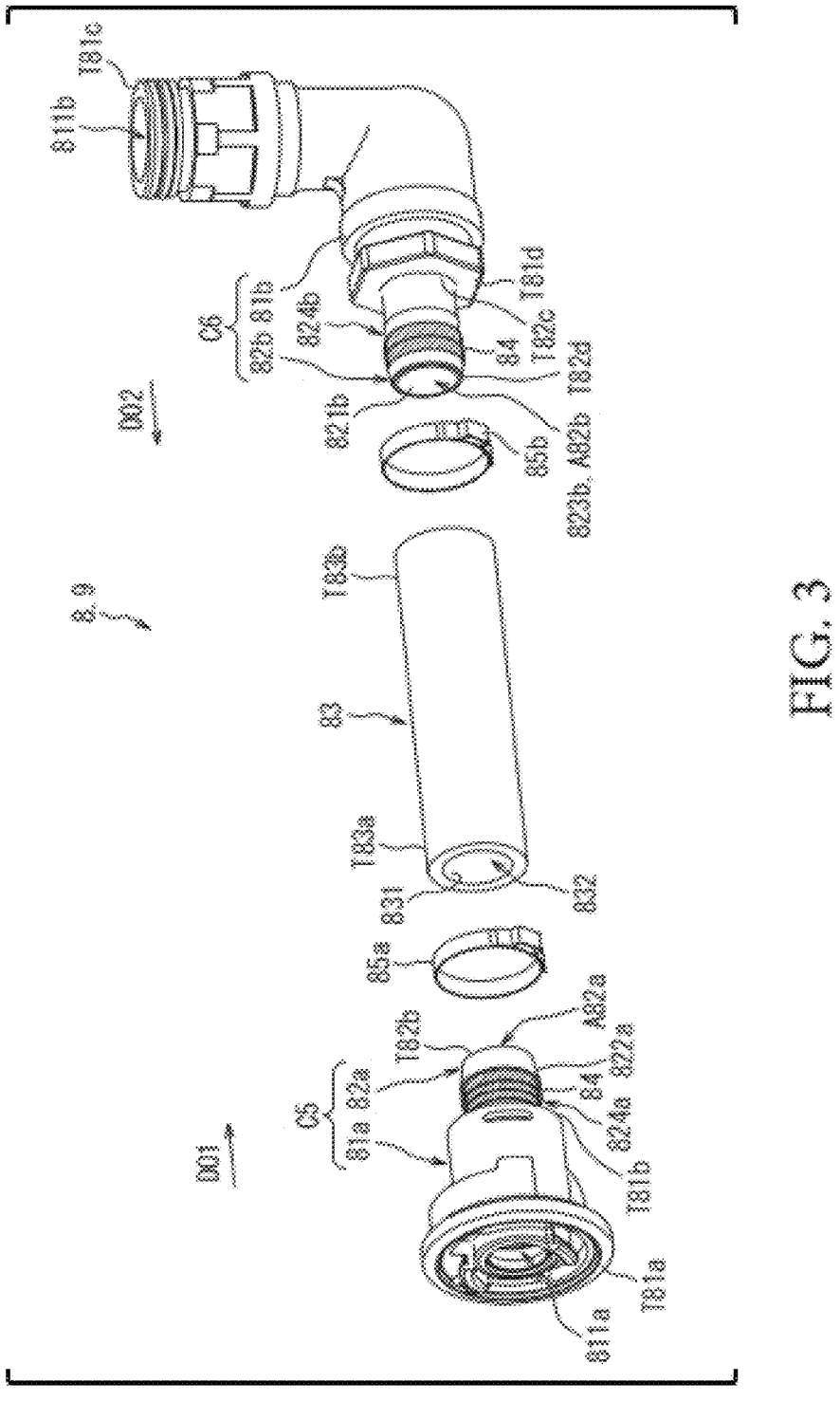
FIG. 3 is an exploded perspective view showing the configuration of the coupling devices 8 and 9 shown in FIG. 1.
Figure 4:
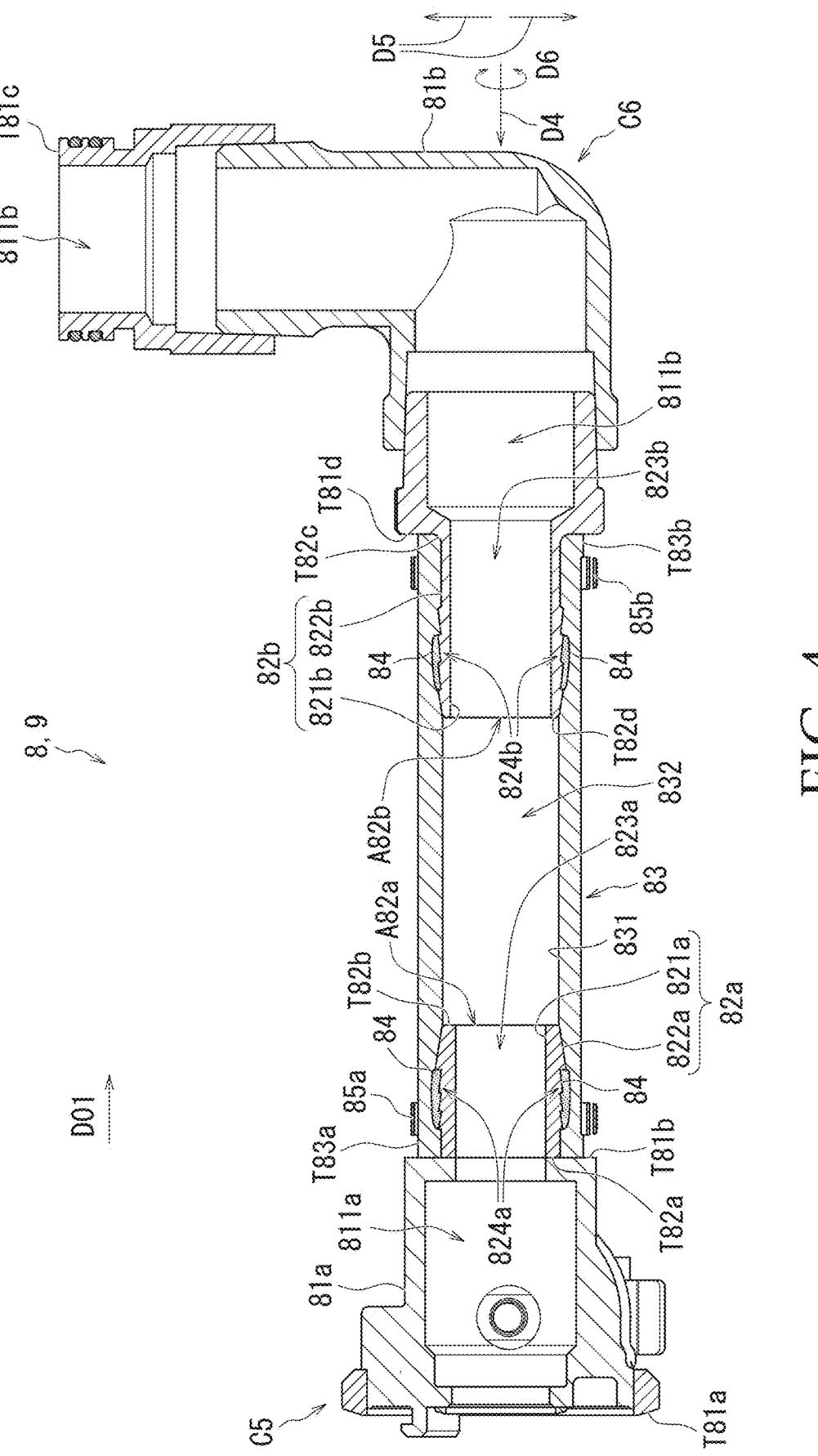
FIG. 4 is a cross-sectional view of the coupling devices 8 and 9 taken along line IV-IV shown in FIG. 2.

As shown in FIGS. 3 and 4, the sealing portion 84 is away from both ends in the first direction D01 of the outer surface 822*a* or both ends in the second direction D04 of the outer surface 822*b*. Therefore, in the process of inserting or after inserting the connection portions 82*a* and 82*b* into the tube portion 83, the sealing portion 84 is less likely to protrude to the flow path 832 or the outside of the tube portion 83.

Figure 5:
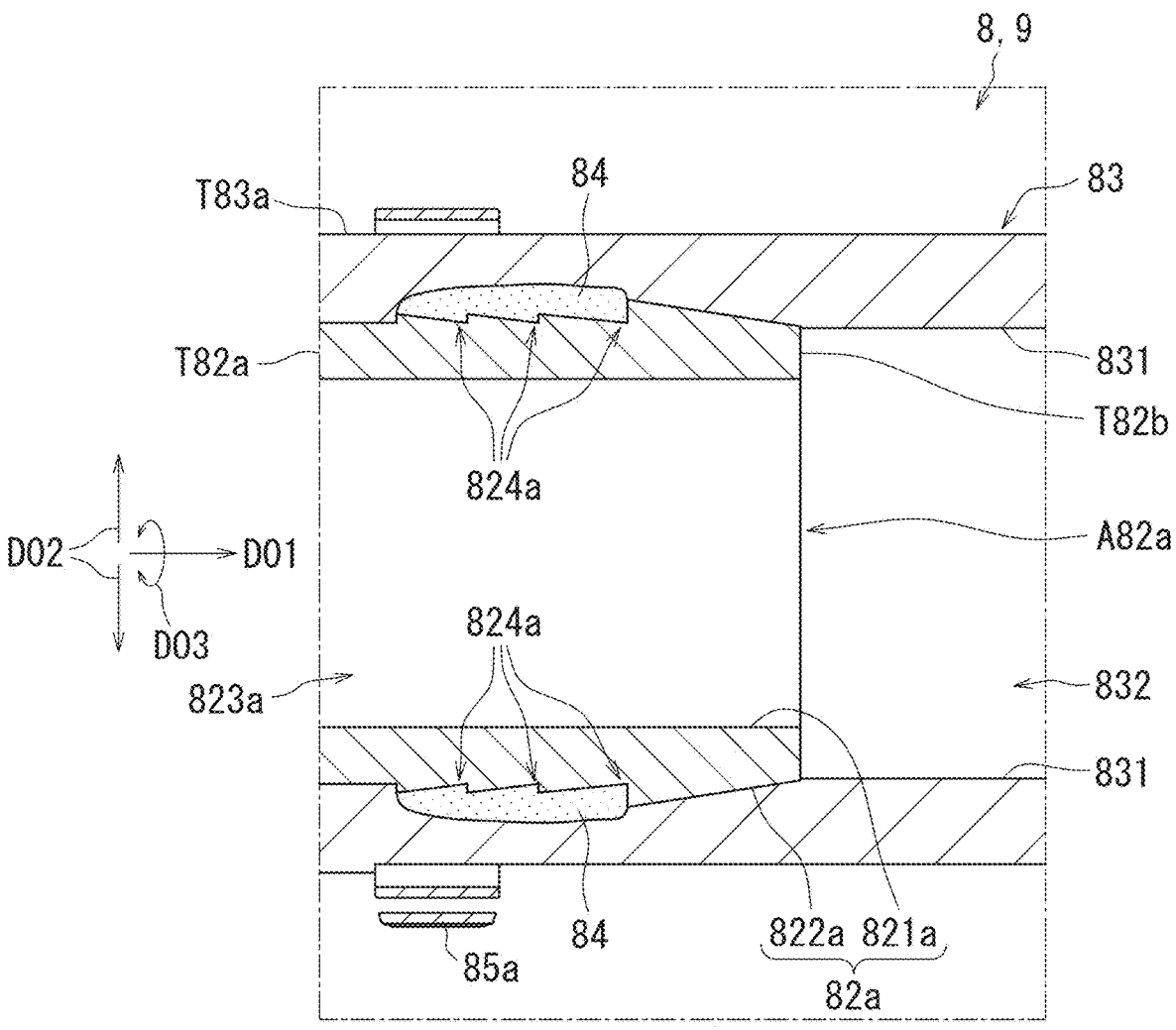
FIG. 5 is an enlarged view of a periphery of a connection portion 82a shown in FIG. 3.

As shown in FIGS. 3 to 5, each of the outer surfaces 822*a* and 822*b* includes a plurality of recess portions 824*a* and 824*b*, respectively. The sealing portion 84 is in the recess portions 824*a* and 824*b*. Due to this, the sealing portion 84 enters the recess portions 824*a* and 824*b* and is solidified. Therefore, due to an anchor effect, the tube portion 83 and the connection portions 82*a* and 82*b* are less likely to be displaced from each other. That is, a gap is suppressed from being generated between the outer surfaces 822*a* and 822*b* and the inner surface 831. The outer surface 822*a* may have at least one recess portion 824*a*. Regarding the number, the same applies to the recess portion 824*b*.

The recess portions 824*a* and 824*b* are formed over the entire circumference of the outer surfaces 822*a* and 822*b*. In other words, the recess portions 824*a* and 824*b* are formed in the entire areas in the circumferential directions D03 and D06 of the outer surfaces 822*a* and 822*b*. Due to this, the anchor effect becomes relatively large, and thus generation of a gap between the outer surfaces 822*a* and 822*b* and the inner surface 831 is further suppressed.

The plurality of recess portions 824*a* and 824*b* are formed in a shape in which the tube portion 83 is easily mounted to the connection portions 82*a* and 82*b*, i.e., a bulge tube shape or a bamboo shoot shape. Specifically, in each of the plurality of recess portions 824*a*, the bamboo shoot shape is a tapered shape in which the dimension in the radial direction D02 of the recess portion 824*a* gradually decreases toward the first direction D01 (i.e., the protruding direction of the connection portion 82*a*). On the outer surface 822*a*, the plurality of recess portions 824*a* having a bamboo shoot shape are aligned in the first direction D01. Details of the bamboo shoot shape similarly apply to the plurality of recess portions 824*b*.

As shown in FIG. 4, the recess portion 824*b* at the end in the second direction D04 in the plurality of recess portions 824*b* may include no sealing portion 84. Alternatively, the recess portion 824*b* at the end may include only a smaller amount of the sealing portion 84 than that in the other recess portions 824*b*. This point similarly applies to the plurality of recess portions 824*a*.

The end portions T83*a* and T83*b* of the tube portion 83 have elasticity. This brings the end portions T83*a* and T83*b* into close contact with the sealing portion 84, and therefore, the secondary refrigerant C2 is further suppressed from leaking from between the outer surfaces 822*a* and 822*b* and the inner surface 831. Specifically, the end portions T83a and T83b are smaller in elastic modulus (i.e., a physical property value indicating difficulty of deformation) than the sealing portion 84 and the connection portions 82a and 82b, respectively.

As shown in FIGS. 2 to 5, the coupling devices 8 and 9 further include fasteners 85a and 85b. The fasteners 85a and 85b fasten the tube portion 83 to the connection portions 82a and 82b. Therefore, the tube portion 83 is less likely to come off from the connection portions 82a and 82b. As a result, the secondary refrigerant C2 is further suppressed from leaking from between the outer surfaces 822a and 822b and the inner surface 831. Each of the fasteners 85a and 85b is a metal band with a fastening fitting, for example. However, the present disclosure is not limited to this, and each of the fasteners 85a and 85b may be a resin band with a fastening tool. In addition, a binding band, a rubber band, or a string can be applied as each of the fasteners 85a and 85b.

The fasteners 85a and 85b are positioned more outward than the sealing portion 84. This brings the end portions T83a and T83b into close contact with the sealing portion 84, and the sealing portion 84 into close contact with the connection portions 82a and 82b. Therefore, the secondary refrigerant C2 is further suppressed from leaking from between the outer surfaces 822a and 822b and the inner surface 831. Specifically, the fasteners 85a and 85b fasten the tube portion 83 to the connection portions 82a and 82b at positions more outward in the radial directions D02 and D05 (see FIGS. 4 and 5) than the sealing portion 84.

As shown in FIG. 5, the fastener 85a is positioned more outward than the recess portion 824a. This brings the end portions T83a and T83b into close contact with the sealing portion 84, and the sealing portion 84 into close contact with the connection portions 82a and 82b. Therefore, the secondary refrigerant C2 is further suppressed from leaking from between the outer surfaces 822a and 822b and the inner surface 831. Specifically, the fastener 85a is positioned more outward in the radial direction D02 than the recess portion 824a.

The thermal expansion coefficient of the inner surface 831 is equal to or greater than the coefficient of thermal expansion of the outer surfaces 822a and 822b. As a result, the rate at which the inner surface 831 expands due to the ambient temperature is equal to or greater than the rate at which the outer surfaces 822a and 822b expand. Therefore, at the time of expansion, since the inner surface 831 is pressed by the outer surfaces 822a and 822b due to the fasteners 85a and 85b, the secondary refrigerant C2 is suppressed from leaking between the outer surfaces 822a and 822b and the inner surface 831.

The example embodiment of the present disclosure is described above with reference to the drawings. However, the present disclosure is not limited to the above example embodiment, and can be implemented in various aspects without departing from the gist of the present disclosure. A plurality of elements disclosed in the above example embodiment can be appropriately modified. For example, a certain element of all elements shown in a certain example embodiment may be added to an element of another example embodiment, or some elements of all elements shown in a certain example embodiment may be removed from the example embodiment.

The drawings schematically show mainly each element in order to facilitate understanding of the present disclosure, and the thickness, length, number, interval, and the like of the elements shown may be different from the actual ones for convenience of the drawings. The configuration of each element shown in the above example embodiment is an example and is not particularly limited, and it goes without saying that various modifications can be made without substantially departing from the effects of the present disclosure.

The present technology can also adopt the following configurations.

(1) A coupling device including a first connection portion connectable to an external socket or plug, the first connection portion including a first flow path through which a fluid flows, a second connection portion including a first inner surface defining a second flow path continuous with the first flow path, and a first outer surface positioned farther outward than the first inner surface, a tube portion including an end portion into which the second connection portion is inserted and a second inner surface positioned outside the first outer surface and defining a third flow path, and a sealing portion interposed between the first outer surface and the second inner surface.

(2) The coupling device according to (1), in which a thermal expansion coefficient of the sealing portion is smaller than a thermal expansion coefficient of the first outer surface and larger than a thermal expansion coefficient of the second inner surface.

(3) The coupling device according to (1) or (2), in which the sealing portion is spaced away from both ends of the first outer surface.

(4) The coupling device according to any of (1) to (3), in which the first outer surface includes a recess portion, and the sealing portion is in the recess portion.

(5) The coupling device according to (4), in which the recess portion is provided over an entire circumference of the first outer surface.

(6) The coupling device according to any of (1) to (5), in which the end portion of the tube portion has elasticity.

(7) The coupling device according to any of (1) to (6), further including a fastener that fastens the tube portion to the second connection portion.

(8) The coupling device according to any of (1) to (7), in which the fastener is positioned farther outward than the sealing portion.

(9) The coupling device according to any of (1) to (8), in which the first outer surface includes a recess portion, and the fastener is positioned farther outward than the recess portion.

(10) The coupling device according to any of (1) to (9), in which a thermal expansion coefficient of the second inner surface is equal to or greater than a thermal expansion coefficient of the first outer surface.

(11) A refrigerant circulation device including a housing including a socket or a plug, and a coupling device, wherein the coupling device includes a first connection portion connected to the socket or the plug and including a first flow path through which a fluid flows, a second connection portion including a first inner surface defining a second flow path continuous with the first flow path, and a first outer surface positioned more outward than the first inner surface, a tube portion including an end portion into which the second connection portion is inserted and a second inner surface positioned outside the first outer surface and defining a third flow path, and a sealing portion interposed between the first outer surface and the second inner surface.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A coupling device comprising:
a first connection portion connectable to an external socket or plug, the first connection portion including a first flow path through which a fluid flows;
a second connection portion including a first inner surface defining a second flow path continuous with the first flow path, and a first outer surface positioned farther outward than the first inner surface;
a tube portion including an end portion into which the the second connection portion is inserted and a second inner surface positioned outside the first outer surface and defining a third flow path; and
a sealing portion interposed between the first outer surface and the second inner surface; wherein
a thermal expansion coefficient of the sealing portion is smaller than a thermal expansion coefficient of the first outer surface and larger than a thermal expansion coefficient of the second inner surface.

2. The coupling device according to claim 1, wherein the sealing portion is spaced away from both ends of the first outer surface.

3. The coupling device according to claim 1, wherein
the first outer surface includes a recess portion; and
the sealing portion is in the recess portion.

4. The coupling device according to claim 3, wherein the recess portion is provided over an entire circumference of the first outer surface.

5. The coupling device according to claim 1, wherein the end portion of the tube portion has elasticity.

6. The coupling device according to claim 1, further comprising a fastener that fastens the tube portion to the second connection portion.

7. The coupling device according to claim 6, wherein the fastener is positioned more outward than the sealing portion.

8. The coupling device according to claim 6, wherein
the first outer surface includes a recess portion; and
the fastener is positioned farther outward than the recess portion.

9. The coupling device according to claim 6, wherein a thermal expansion coefficient of the second inner surface is equal to or greater than a thermal expansion coefficient of the first outer surface.

10. A refrigerant circulation device comprising:
a housing including a socket or a plug; and a coupling device; wherein
the coupling device includes:
a first connection portion connected to the socket or the plug and including a first flow path through which a fluid flows;
a second connection portion including a first inner surface defining a second flow path continuous with the first flow path, and a first outer surface positioned more outward than the first inner surface;
a tube portion including an end portion into which the second connection portion is inserted and a second inner surface positioned outside the first outer surface and defining a third flow path; and
a sealing portion interposed between the first outer surface and the second inner surface.

11. The refrigerant circulation device according to claim 10, wherein
a thermal expansion coefficient of the sealing portion is smaller than a thermal expansion coefficient of the first outer surface and larger than a thermal expansion coefficient of the second inner surface.

12. The refrigerant circulation device according to claim 10, wherein the sealing portion is spaced away from both ends of the first outer surface.

13. The refrigerant circulation device according to claim 10, wherein
the first outer surface includes a recess portion; and
the sealing portion is in the recess portion.

14. The refrigerant circulation device according to claim 13, wherein the recess portion is provided over an entire circumference of the first outer surface.

15. The refrigerant circulation device according to claim 10, wherein the end portion of the tube portion has elasticity.

16. The refrigerant circulation device according to claim 10, further comprising a fastener that fastens the tube portion to the second connection portion.

17. The refrigerant circulation device according to claim 16, wherein the fastener is positioned more outward than the sealing portion.

18. The refrigerant circulation device according to claim 16, wherein
the first outer surface includes a recess portion; and
the fastener is positioned farther outward than the recess portion.

19. The refrigerant circulation device according to claim 16, wherein a thermal expansion coefficient of the second inner surface is equal to or greater than a thermal expansion coefficient of the first outer surface.

* * * * *